United States Patent
Georgiev

(10) Patent No.: US 9,454,798 B2
(45) Date of Patent: Sep. 27, 2016

(54) SYSTEMS AND METHODS OF AUTOMATIC IMAGE SIZING

(71) Applicant: Adobe Systems Incorporated, San Jose, CA (US)

(72) Inventor: Evtim Ivanov Georgiev, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 240 days.

(21) Appl. No.: 13/974,210

(22) Filed: Aug. 23, 2013

(65) Prior Publication Data

US 2015/0054853 A1   Feb. 26, 2015

(51) Int. Cl.
 *G06T 3/40* (2006.01)
 *G06T 11/60* (2006.01)

(52) U.S. Cl.
 CPC ..... *G06T 3/40* (2013.01); *G06T 11/60* (2013.01)

(58) Field of Classification Search
 CPC ....... G06T 11/60; G06T 11/221; G06T 3/40; G06F 17/212
 See application file for complete search history.

(56) References Cited

U.S. PATENT DOCUMENTS

| | | | |
|---|---|---|---|
| 7,133,050 B2 * | 11/2006 | Schowtka | 345/620 |
| 2007/0186154 A1 * | 8/2007 | Anthony et al. | 715/517 |
| 2012/0109776 A1 * | 5/2012 | Fagans et al. | 705/26.5 |

* cited by examiner

*Primary Examiner* — Kee M Tung
*Assistant Examiner* — Whitney Pointe
(74) *Attorney, Agent, or Firm* — Shook, Hardy & Bacon, L.L.P.

(57) ABSTRACT

Systems and methods of automatic image sizing are provided. An image is provided in a first frame within a first layout. A request to display the image in a second frame of a second layout is received, where the second frame is different than the first frame. Region data associated with the image is accessed. The region data corresponds to a prior edit to the image and indicates a portion of the image to be displayed in the second frame. The image is provided in the second frame using the region data such that the portion of the image is displayed in the second frame.

25 Claims, 7 Drawing Sheets

SYSTEMS AND METHODS OF AUTOMATIC IMAGE SIZING

TECHNICAL FIELD

This disclosure relates generally to the technical fields of software and/or hardware technology and, in one example embodiment, to systems and methods of automatic image sizing.

BACKGROUND

The use of computing devices to create digital photo albums has become a popular way for people to organize photographs. The ease of sorting through photographs on a computing device has given way to many viewing and editing tools.

Although the utilization of computing devices to view, edit, and organize photographs may be helpful, current tools are generally limited. For example, while a user may be able to use different layout options for photographs, these layout options may require manual editing of the photographs such that each photograph is properly fitted into the frames of the layout.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
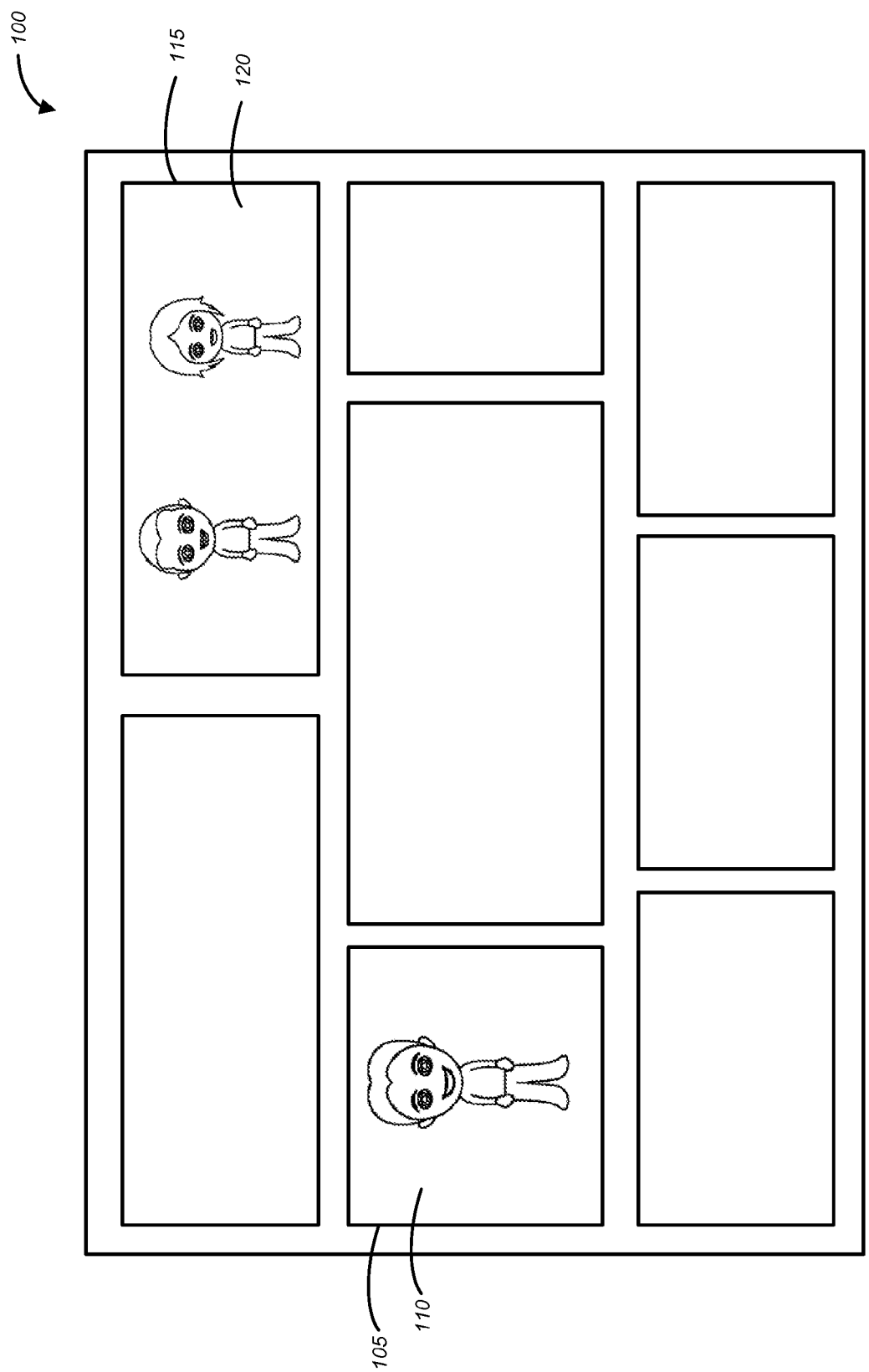
FIG. 1 is an interface diagram illustrating a user interface, in accordance with an example embodiment, displaying a layout of images.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Some portions of the detailed description which follow are presented in terms of algorithms or symbolic representations of operations on binary digital signals stored within a memory of a specific apparatus or special purpose computing device or platform. In the context of this particular specification, the term "specific apparatus" or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As used herein, a "document" or "an electronic document" refers to electronic media content that is accessible by computer technology. For example, a document can be a file that is not an executable file or a system file and includes data for use by a computer program. An example of a document includes a single or multiple files that are accessible by and/or associated with electronic document processing applications such as word processing applications, document viewers, email applications, presentation applications, spreadsheet applications, diagramming applications, graphic editors, graphic viewers, enterprise applications, web design applications, and other applications. Therefore, as explained in more detail below, a document may be composed of alphanumeric texts, symbols, images, videos, sounds, and other data. It should be appreciated that a document can have a variety of file formats that, for example, may be identified by data within a document and/or by the filename extension. Examples of file formats that may be associated with a document include Adobe Portable Document Format (PDF), Microsoft DOC format, Hypertext Markup Language (HTML) format, Extensible Markup Language (XML) format, Microsoft XLS format, Cascading Style Sheet (CSS) format, Tag Image File Format (TIFF), Rich Text Format (RTF), Report File Format (RPT), and the like.

Methods and systems are described that provide automatic image sizing. An image may be automatically sized to fit a particular frame within a user interface such that certain portions of the image are featured in that frame based on prior edits previously made to the image. For example, a particular layout for one or more images to be displayed on a user interface may be provided on a computing device of a user. The user may have the ability to edit and/or adjust an image in a frame of the layout in any suitable manner such that certain portions of the image are visible within the frame. The edits and/or adjustments made to the image may be any suitable edits and/or adjustments a user may make to the image within the frame, such as cropping the image, zooming into the image, zooming out of the image, and the like. An edit or adjustment made to an image may be made such that the adjusted portion of the image is visible within a particular frame. For example, if a user adjusts an image by cropping the image in a particular manner, the uncropped portion of the image may be the adjusted portion that is visible within the frame. In some embodiments, an edit to an image may not impact or reduce the amount of image data stored as part of the image. For example, if an image is cropped, the image data may include the cropped and uncropped data such that the image may be later fitted into a larger frame if desired. If a new layout is chosen for the image, the image may be automatically resized such that the portion of the image that was visible within the prior frame is similarly displayed within a frame in the new layout. For example, the new layout may result in the image being displayed within a new frame that is different than the previous frame in the prior layout (e.g., different frame aspect ratio, different frame size, etc.). The image may be automatically displayed in the new frame by using region data associated with any prior edits and/or adjustments to the image. The region data may indicate the portion of the image that is to be displayed within a frame with respect to any adjustments made to the image. The region data may be stored and accessed in any suitable manner. For example, the region data may be stored locally on the user's computing device, or the user's computing device may access and store the region data on a server using a direct connection or over a network, which may be any suitable network. In various embodiments, one or more portions of the network may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

Region data for an image may be generated when a user edits the image. When a user edits an image, a unique image identifier associated with the image may be associated and stored with the region data indicating the portion of the image to be displayed in the frame. Additional information may be associated and stored with the region data, such as frame information (e.g., frame aspect ratio of the frame displaying the image when the image was edited, the frame size of the frame displaying the image when the image was edited, etc.), and the like. In some embodiments, if an image is to be fitted within a particular frame having a certain frame aspect ratio and/or size, region data associated with the same or a similar frame aspect ratio and/or size may be used to display an indicated portion of the image within that particular frame. In some embodiments, if region data for a similar frame type is unavailable, the region data for different types of frames may be used to deduce region data that may be used to size the image to that particular frame. In some embodiments, the deduced region data may be stored and associated with the unique image identifier and frame information (e.g., frame aspect ratio, frame size, etc.) for that particular frame. In other embodiments, the region data may be deduced any time the region data for a similar frame type is unavailable. In some embodiments, region data may be generated and stored each time a user edits an image. In some embodiments, region data for an image displayed in a particular frame type may be overwritten when a subsequent edit is performed for the image in that particular frame type.

In some embodiments, the region data may be made available to one or more applications on a computing device such that images may be automatically sized in the applications based on prior user edits.

FIG. 1 is an interface diagram illustrating user interface 100, in accordance with an example embodiment, displaying a layout of images, such as image 110 and image 120. The user interface 100 may be used to view, edit, organize, and/or arrange the images. The images may be arranged by a user in any manner and/or configuration. For example, the number of images, the location of the images on the user interface 100, the orientation of the images, and the like may be arranged in any manner. The images may be images stored on a computing device displaying the images and/or accessed by the computing device (e.g., from a storage device external to the computing device). In some embodiments, the images may be accessed from a third-party website using a network. A user may select the images the user would like to display through the user interface 100.

In the example user interface 100, image 110 may be displayed in frame 105 and may be an image that was edited by a user. For example, image 110 may have been edited (e.g., cropped, zoomed, etc.) such that a particular portion of the image 110 (e.g., the person displayed in image 110) is displayed within the frame 105. Similarly, image 120 may be an image that was also edited by the user such that a particular portion of the image 120 (e.g., the two people displayed in image 120) is displayed within frame 115.

Figure 2:
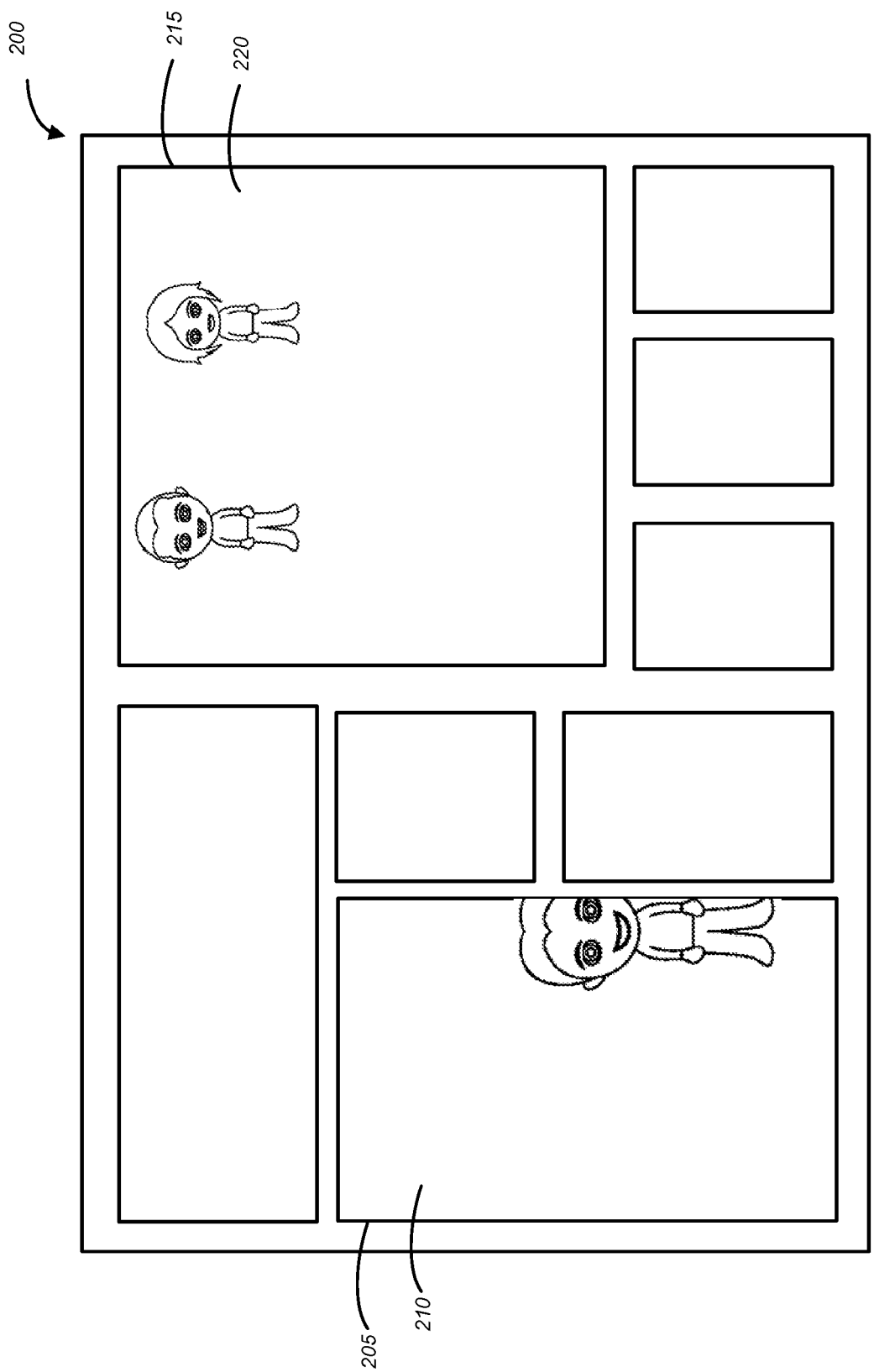
FIG. 2 is an interface diagram illustrating a user interface, in accordance with an example embodiment, displaying a layout of images without automatic image sizing.

FIG. 2 is an interface diagram illustrating a user interface 200, in accordance with an example embodiment, displaying a layout of images without automatic image sizing. The example user interface 200 shows a change in the layout of images from the layout depicted in user interface 100 of FIG. 1. The layout of images may be changed in any suitable manner. For example, the layout may be changed when a user selects a different layout template for displaying the images. In another example, a user may manually change the layout of images by changing (e.g., increasing and/or decreasing the size and/or aspect ratio of the frames, etc.) and/or rearranging the frames within a layout.

In the example user interface 200, frame 205 has been changed such that the aspect ratio and the size of frame 205 are different from frame 105 of FIG. 1. In response to this change, the portion of the image 210 that is visible within frame 205 may not reflect the user edits to the image that were made in the previous layout (as was displayed in frame 105 of FIG. 1). Without automatic sizing of the image 210, a user may have to edit the image 210 again in order to feature the portion of the image 210 that the user wishes to display.

Similarly, frame 215 has been changed such that the aspect ratio and the size of frame 215 are different from frame 115 of FIG. 1. In response to this change, the portion of the image 220 that is visible within frame 215 may not reflect the user edits to the image that were made in the previous layout (as was displayed in frame 115 of FIG. 1). Without automatic sizing of the image 220, a user may have to edit the image 210 again in order to feature the portion of the image 220 that the user wishes to display.

Figure 3:
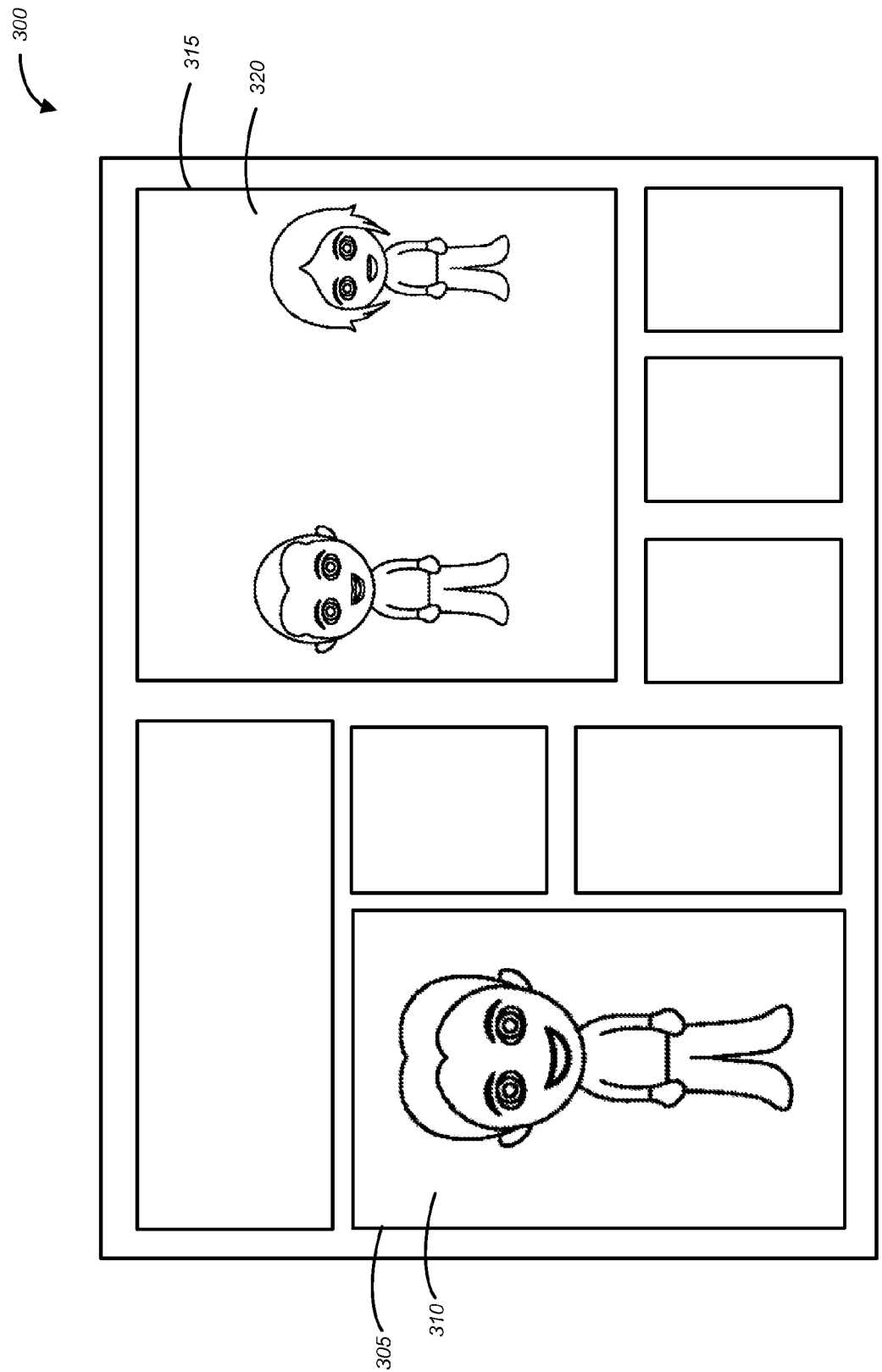
FIG. 3 is an interface diagram illustrating a user interface, in accordance with an example embodiment, displaying a layout of images with automatic image sizing.

FIG. 3 is an interface diagram illustrating a user interface 300, in accordance with an example embodiment, displaying a layout of images with automatic image sizing. The example user interface 300 shows a change in the layout of images from the layout depicted in user interface 100 of FIG. 1. The images displayed in the frames of the layout of FIG. 3 may be automatically sized such that the images are displayed in a manner that accounts for previous edits, such as the edits made to the images of FIG. 1. As shown in the user interface 300 of FIG. 3, the image 310 within frame 305 may account for prior user edits by displaying a particular portion of the image 310 that the user wishes to display (e.g., the person displayed in image 310). Similarly, the image 320 within frame 315 may account for prior user edits by displaying a particular portion of the image 320 that the user wishes to display (e.g., the two people displayed in image 320).

Figure 4A:
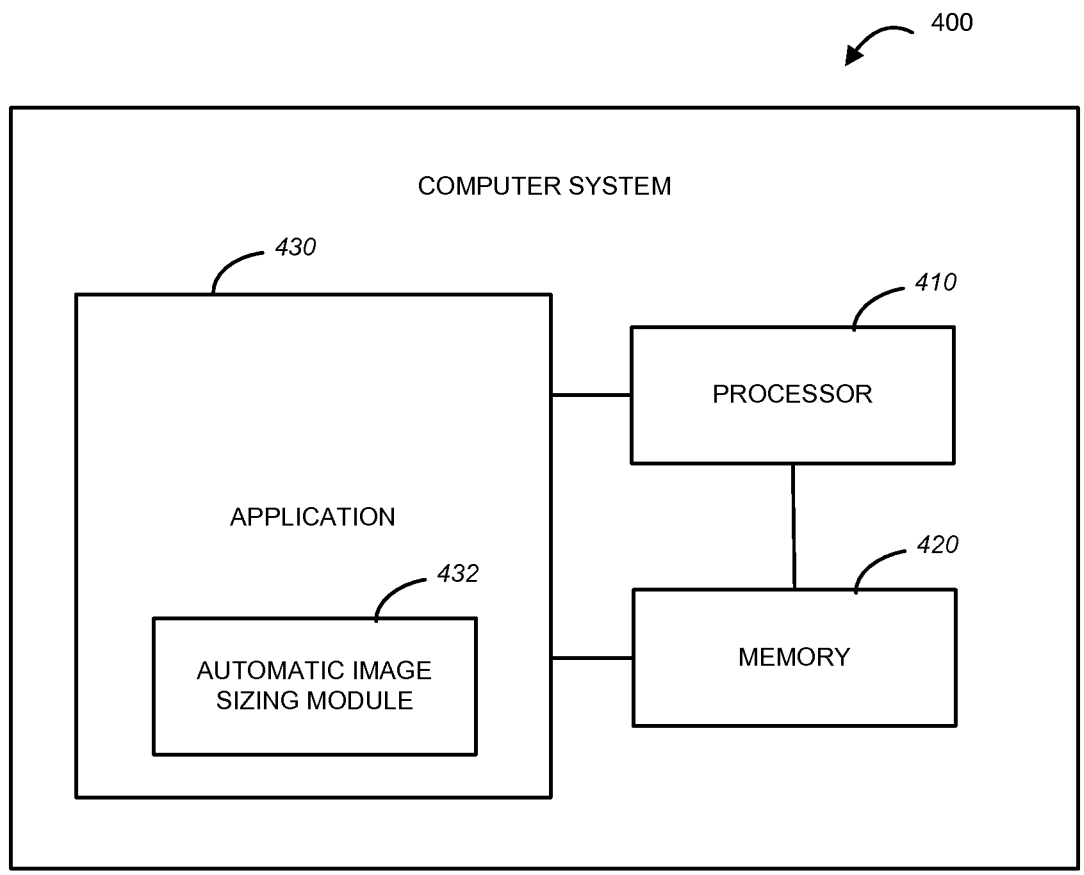
FIG. 4A is a block diagram showing a system architecture, in accordance with an example embodiment, within which an automatic image sizing module system and method are implemented.

FIG. 4A is a block diagram showing an example system architecture, in accordance with an example embodiment, within which an automatic image sizing system and method are implemented. The computer system 400 may comprise one or more processors including one or more processors 410 coupled to a memory 420 and an application 430. The application 430 may be any software application providing a user with the ability to view, edit, and arrange images and may include an automatic image sizing module 432. The automatic image sizing module 432 may be implemented as a module that is part of the application 430 or as a plug-in that can be utilized with the application 430. The automatic image sizing module 432, in one example embodiment, may be configured to provide automatic image sizing for different image layouts available to a user.

Figure 4B:
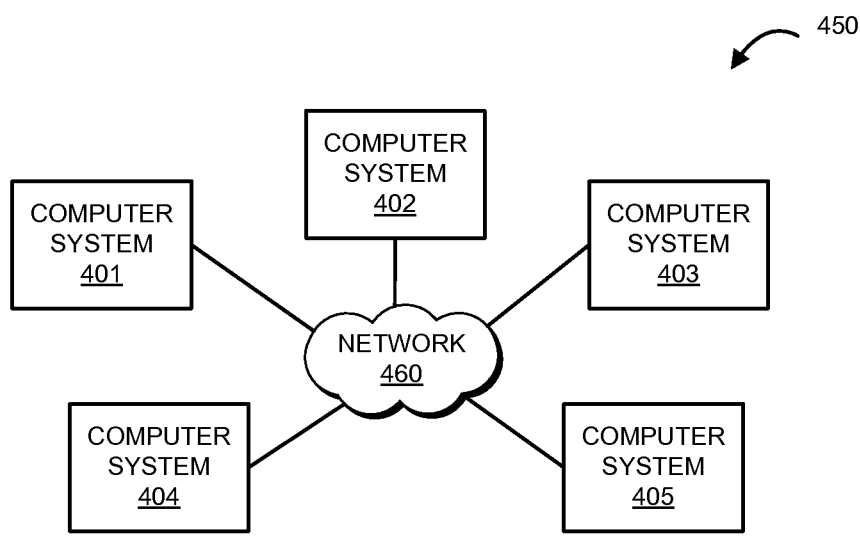
FIG. 4B is a block diagram showing a networked system, in accordance with an example embodiment, within which automatic image sizing is implemented.

FIG. 4B is a block diagram showing a networked system 450, in accordance with an example embodiment, within which automatic image sizing is implemented. The networked system 450 may include any number of computer systems similar to the computer system 400 of FIG. 4A. In the example of FIG. 4B, the example networked system 450 includes computer systems 401, 402, 403, 404, and 405, all communicatively coupled through a network 460. As previously described, the network 460 may be in any form, such as a LAN, WAN, a portion of the Internet, and the like. The network 460 may be used to communicate any images and any data associated with the images (e.g., region data). In some embodiments, one of the computer systems in networked system 450 may be a computer system for accessing and storing images and/or any data associated with the images.

Figure 5:
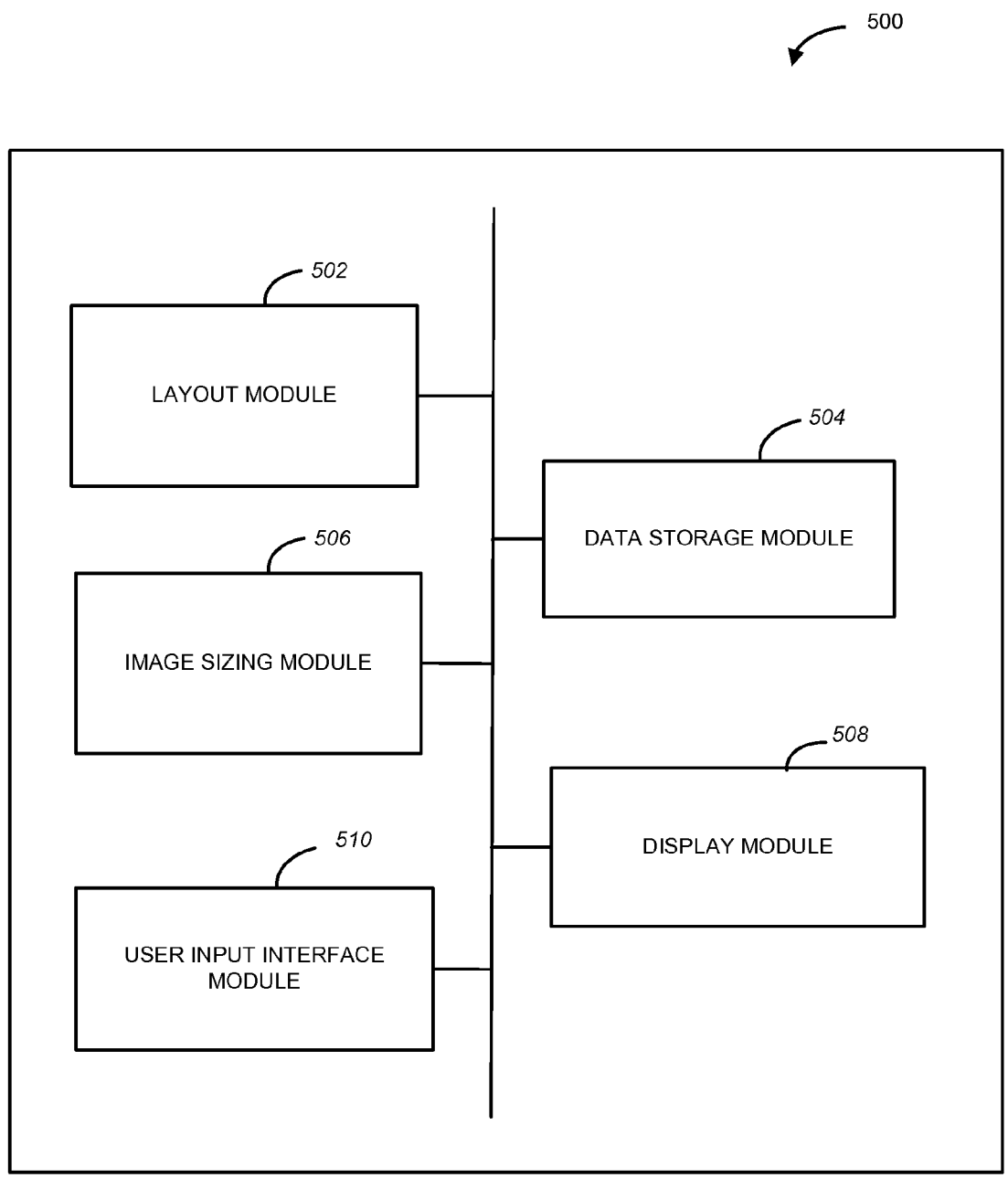
FIG. 5 is a block diagram showing components, in accordance with an example embodiment, of an automatic image sizing system.

FIG. 5 is a block diagram showing components, in accordance with an example embodiment, of an automatic image sizing system 500. In one example embodiment, the system 500 for providing automatic image sizing may be associated with an application and may correspond to the automatic image sizing module 432 of FIG. 4A. Each of the modules of the system 500 may be implemented utilizing at least one processor.

As shown in FIG. 5, the system 500 includes a layout module 502, a data storage module 504, an image sizing module 506, a display module 508, and a user input interface module 510.

The layout module 502 may be a hardware-implemented module which may store, access, manage, and control layouts for images. The layout module 502 may store layout templates for different types of layouts (e.g., different arrangements for images) that a user may choose for displaying images. Layout templates may be stored in any suitable storage location, such as on a computing device of the user, on a server accessible over a network, and the like. The layout module 502 may also receive and process user requests to change a particular layout being displayed on the computing device of the user. The layout may be changed using available layout templates, or the layout may be manually changed by a user. The layout module 502 may also store any layout templates created by a user.

The data storage module 504 may be a hardware-implemented module which may store, access, manage, and control image data associated with one or more images, such as region data, unique image identifiers, frame information, and the like. A unique image identifier may be an identifier associated with a particular image and may uniquely identify the image. For example, the unique image identifier may be a hash of image data associated with the image, a uniform resource identifier (URI), and the like. The frame information may indicate a type of frame within which an image is to be displayed, such as information about the frame aspect ratio of the frame, the frame size of the frame, and the like. The region data may include data that indicates a particular image portion that is to be displayed within a particular frame type associated with the region data. In some embodiments, the region data may be data that indicates a portion of the image in normalized coordinates, which may be useful for displaying the portion of the image in different display resolutions. When region data is generated for a particular image that has been edited within a particular frame, the region data may be associated with the unique image identifier of the image as well as information about the type of frame (e.g., frame aspect ratio, frame size, etc.) within which the image was displayed and edited.

In some embodiments, the data storage module 504 may sort and store the region data according to the frame information associated with the region data. For example, the data storage module 504 may sort and store the region data based on frame aspect ratio and/or frame size.

The data storage module 504 may store the image information locally (e.g., on a user's computing device) or on a server in communication with a computing device. The data storage module 504 may store the image information for any suitable period of time (e.g., while the user is editing images and/or layouts).

The image sizing module 506 may be a hardware-implemented module which may determine, generate, store, access, and process region data such that an image may be displayed within a particular frame based on the region data. The image sizing module 506 may determine a portion of an image to be displayed within a frame in response to a user edit and generate region data based on the determined portion. For example, when a user crops an image displayed in a particular frame, the image sizing module 506 may determine the portion to be displayed and generate region data indicating the portion of the image that is to be visible within that frame. In some embodiments, the region data may be generated in normalized coordinates. In some embodiments, the region data may be generated each time a user edits an image within a particular frame.

The display module 508 may be a hardware-implemented module which may generate and provide display data to display an image within a frame of a layout. The display module 508 may use the region data to display a particular portion of an image within a particular frame.

The user input interface module 510 may be a hardware-implemented module which may receive and process user inputs from a user. For example, the user input interface module 510 may receive a user input indicating a request to edit an image, change a layout for the image, and the like.

Figure 6:
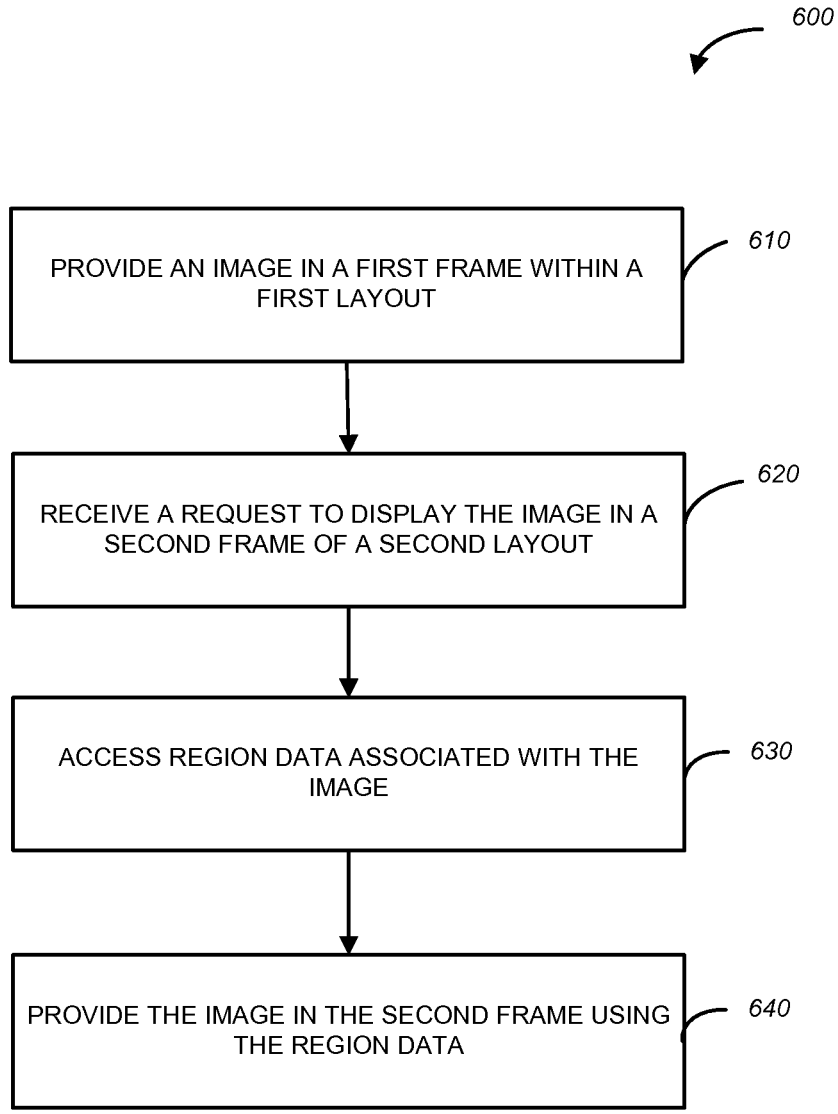
FIG. 6 is a flowchart showing a method, in accordance with an example embodiment, of automatic image sizing.

FIG. 6 is a flowchart showing a method 600, in accordance with an example embodiment, of automatic image sizing. The method 600 may be performed using the various modules of the system 500 shown in FIG. 5.

In operation 610, the display module 508 may provide an image in a first frame within a first layout. The image may be provided within the first frame based on any edits made by the user. For example, if a user crops an image, the cropped image may be provided in the frame.

In operation 620, the layout module 502 may receive a request to display the image in a second frame of a second layout. The request may be received based on a user input received by the user input interface module 510 from a computing device of a user. The request may indicate that the layout is to be changed from the first layout to a second layout. The request may be based on any request to change a layout, such as a request to use a different layout template, a user input indicating a change in one or more frames of the first layout (e.g., user resizes a frame), and the like. In some embodiments, the request may be based on a request to change an image within a frame. For example, if a user changes the current image in a frame to a new image, this request to change the image may initiate automatic sizing for the new image.

In operation 630, the image sizing module 506 may access region data associated with the image. The region data associated with a particular image may be accessed via the data storage module 504. The region data may be accessed by determining the frame aspect ratio and/or frame size of the second frame in the second layout and finding region data corresponding to the unique image identifier of the image and having the same or similar frame type as the second frame. For example, the image sizing module 506 may determine the frame aspect ratio of the second frame and may access stored region data associated with the same or similar frame aspect ratio. In some embodiments, if region data is unavailable for a particular frame aspect ratio, the image sizing module 506 may access region data for different frame aspect ratios displaying the image and use that region data to extrapolate region data for the image in the second frame. In some embodiments, if more than one set of region data is available for a particular frame aspect ratio, the image sizing module 506 may use the region data associated with the same or similar frame size. The region data may be extrapolated using the frame size as well.

Region data may be extrapolated in any suitable manner. In some embodiments, when an image is to be fitted in a particular frame, region data associated with a frame that has the closest frame aspect ratio to the frame aspect ratio of that particular frame may be used to automatically size the image for that particular frame. In some embodiments, if region data is stored for more than one frame aspect ratio, each corner of the new region to be displayed within a particular frame of a particular frame aspect ratio may be extrapolated using existing region data. Any suitable approximation function may be used. For example, an approximation function $Fn(x)=Pn$ may be used, where x is the frame aspect ratio of the particular frame within which the image is to be fitted. P1, P2, P3, and P4 are the coordinates of the four corners of the new region. F1, F2, F3, and F4 are any suitable spline functions constructed from the existing region data.

In operation 640, the display module 508 may provide the image in the second frame using the region data. The display module 508 may use the region data to determine the portion of the image to display within the second frame. In some embodiments, the portion of the image may be displayed within the second frame using an aspect fit operation based on the region data, where the image may be scaled uniformly such that the portion to be displayed fills as much of the frame without overlapping the frame. In some embodiments, the portion of the image may be displayed within the second frame using an aspect fill operation based on the region data, where the image may be scaled uniformly such that the portion to be displayed fills the minimum region to completely encompass the frame, in which case it is possible that the frame may be overlapped by the portion to be displayed. In some embodiments, the portion of the image to be displayed within the second frame may be centered within the frame.

Figure 7:
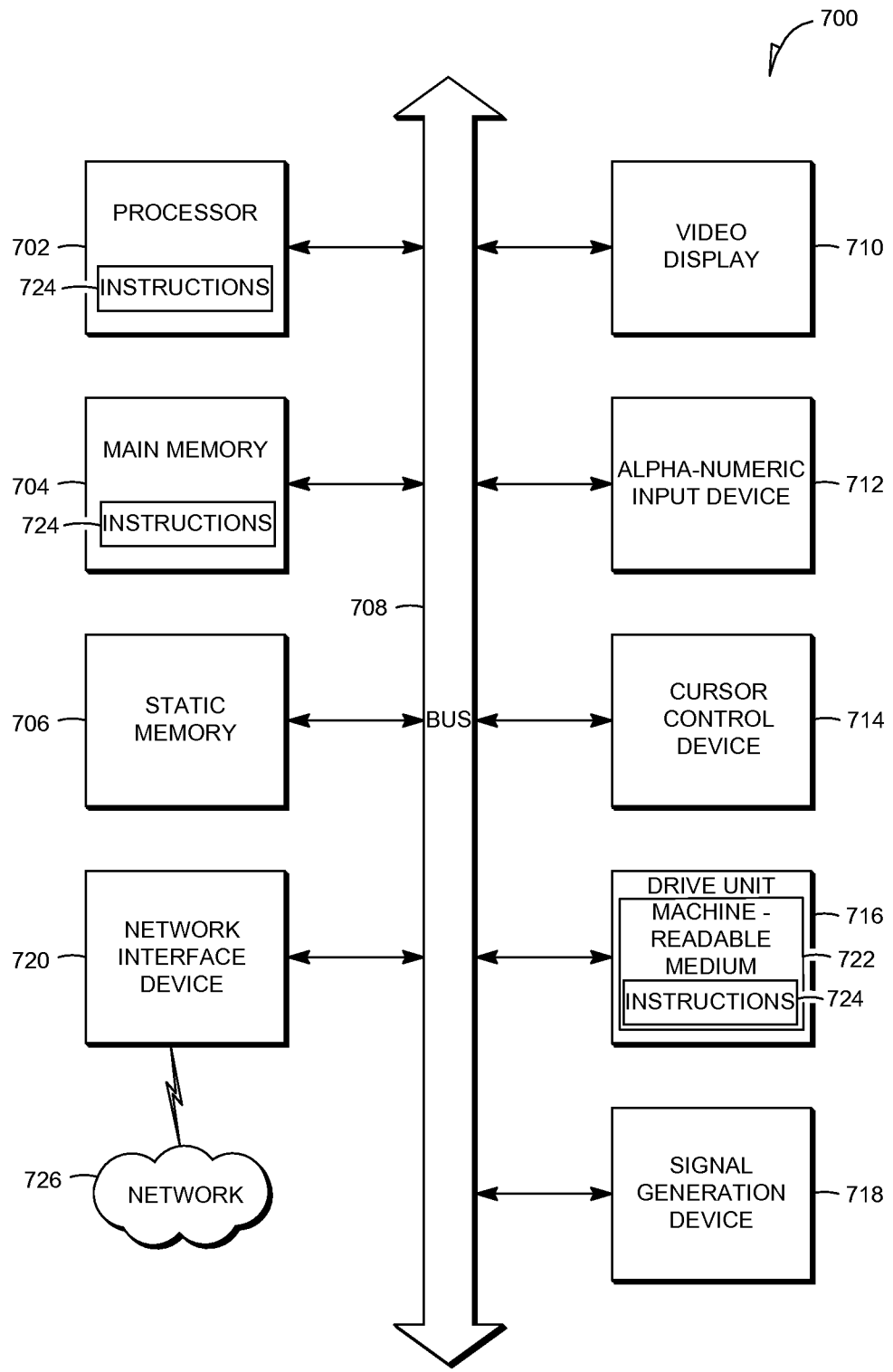
FIG. 7 is a diagrammatic representation of a machine in the example form of a computer system within which a set of instructions may be executed to cause the machine to perform any one or more of the methodologies illustrated in accordance with FIGS. 1-6 related to automatic image sizing.

FIG. 7 is a diagrammatic representation of a machine in the example form of a computer system 700 within which may be executed a set of instructions 724 for causing the machine to perform any one or more of the methodologies related to automatic image sizing, in accordance with an example embodiment. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker), and a network interface device 720.

The disk drive unit 716 includes a non-transitory machine-readable storage medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media.

The instructions 724 may further be transmitted or received over a network 726 via the network interface device 720 utilizing any one of a number of well-known transfer protocols (e.g., Hyper Text Transfer Protocol (HTTP)).

While the non-transitory machine-readable storage medium 722 is shown in an example embodiment to be a single medium, the term "machine-readable storage medium" should be taken to include a single medium or multiple media (e.g., a centralized or distributed database, and/or associated caches and servers) that store the one or more sets of instructions 724. The term "machine-readable storage medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable storage medium" shall accordingly be taken to include, but not be limited to, solid-state memories, optical and magnetic media. Such media may also include, without limitation, hard disks, floppy disks, flash memory cards, digital video disks, random access memory (RAM), read only memory (ROM), and the like.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, methods and systems for automatic image sizing have been described. Although the inventive subject matter has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A computer-implemented method, comprising:
providing, by a device, an image in a first frame within a first layout, the image having region data associated therewith, wherein the region data indicates a portion of the image that is visible within at least the first frame based on a first adjustment;
receiving, by the device, a request to display the image in a second frame of a second layout, the second frame being different than the first frame;
adjusting, by the device, in accordance with at least the region data associated with the image, the image for display in the second frame such that the portion of the image visible within at least the first frame is visible within the second frame; and
providing, by the device, the adjusted image in the second frame such that the portion of the image is visible within the second frame in accordance with at least the region data.

2. The computer-implemented method of claim 1, further comprising:
receiving a user input indicating a second adjustment to the portion of the image visible within the second frame such that an adjusted portion of the image is visible within the second frame based on the second adjustment;
generating adjusted region data corresponding to the second adjustment; and
storing the adjusted region data.

3. The computer-implemented method of claim 2, wherein the second adjustment includes at least one of a cropping of the image, zooming into the image, zooming out of the image, a movement of the image, and a rescaling of the image.

4. The computer-implemented method of claim 2, wherein the storing of the adjusted region data includes storing the adjusted region data with an identifier associated with the image and frame information associated with the second frame, the frame information indicating at least one of frame aspect ratio of the second frame and a frame size of the second frame.

5. The computer-implemented method of claim 2, wherein generating the adjusted region data corresponding to the second adjustment comprises:
accessing a set of region data for varying frame aspect ratios of the image, the set of region data including the region data indicating the portion of the image to be visible within the second frame; and
extrapolating the adjusted region data based on the frame aspect ratios of the set of region data.

6. The computer-implemented method of claim 2, wherein generating the adjusted region data corresponding to the second adjustment comprises:
accessing a set of region data for varying frame sizes of the image, the set of region data including the region data indicating the portion of the image to be visible within the second frame; and
extrapolating the adjusted region data based on the frame sizes of the set of region data.

7. The computer-implemented method of claim 1, wherein the region data indicates the portion of the image to be visible within the second frame using normalized coordinates.

8. The computer-implemented method of claim 1, further comprising:
accessing a set of region data for varying frame aspect ratios of the image, the set of region data including the region data indicating the portion of the image to be visible within the second frame; and
determining that a particular frame aspect ratio associated with the region data is similar to a frame aspect ratio of the second frame.

9. The computer-implemented method of claim 1, further comprising:
accessing a set of region data for varying frame sizes of the image, the set of region data including the region data indicating the portion of the image to be visible within the second frame; and
determining that a particular frame size associated with the region data is similar to a frame size of the second frame.

10. The computer-implemented method of claim 1, wherein the image is adjusted for display in the second frame in further accordance with frame information associated with the second frame, the frame information indicating at least one of a frame aspect ratio of the second frame and a frame size of the second frame.

11. A computing device, comprising:
a hardware-implemented display module configured to provide an image in a first frame within a first layout in accordance with at least region data associated with the image, wherein the region data indicates a portion of the image that is visible within at least the first frame based on a first adjustment;
a hardware-implemented layout module configured to receive a request to display the image in a second frame of a second layout, the second frame being different than the first frame; and
a hardware-implemented image sizing module configured to access region data associated with the image and frame information associated with the second frame, wherein the hardware-implemented display module is further configured to: adjust the image in accordance with the region data and the frame information associated with the second frame, such that the portion of the image visible within at least the first frame is visible within the second frame, and provide the adjusted image in the second frame such that the portion of the image is visible within the second frame in accordance with the region data and the frame information associated with the second frame.

12. The computing device of claim 11, further comprising:
a hardware-implemented user input module configured to receive a user input indicating a second adjustment to the portion of the image visible within the second frame such than an adjusted portion of the image is visible within the second frame based on the second adjustment, wherein the hardware-implemented image sizing module is further configured to generate adjusted region data corresponding to the second adjustment; and
a hardware-implemented region data storage module configured to store the adjusted region data.

13. The computing device of claim 12, wherein the second adjustment includes at least one of a cropping of the image, zooming into the image, zooming out of the image, a movement of the image, and a rescaling of the image.

14. The computing device of claim 12, wherein the region data storage module is further configured to store the adjusted region data with an identifier associated with the image and the frame information associated with the second frame, the frame information associated with the second frame indicating at least one of a frame aspect ratio of the second frame and a frame size of the second frame.

15. The computing device of claim 12, wherein the hardware-implemented image sizing module is further configured to:
   access a set of region data for varying frame aspect ratios of the image, the set of region data including the region data indicating the portion of the image to be visible within the second frame; and
   extrapolate the adjusted region data based on the frame aspect ratios of the set of region data.

16. The computing device of claim 12, wherein the hardware-implemented image sizing module is further configured to:
   access a set of region data for varying frame sizes of the image, the set of region data including the region data indicating the portion of the image to be visible within the second frame; and
   extrapolate the adjusted region data based on the frame sizes of the set of region data.

17. The computing device of claim 11, wherein the hardware-implemented image sizing module is further configured to:
   access a set of region data for varying frame aspect ratios of the image, the set of region data including the region data indicating the portion of the image to be visible within the second frame; and
   determine that a particular frame aspect ratio associated with the region data is similar to a frame aspect ratio of the second frame.

18. The computing device of claim 11, wherein the hardware-implemented image sizing module is further configured to:
   access a set of region data for varying frame sizes of the image, the set of region data including the region data indicating the portion of the image to be visible within the second frame; and
   determine that a particular frame size associated with the region data is similar to a frame size of the second frame.

19. The computing device of claim 11, wherein the frame information associated with the second frame indicates at least one of a frame aspect ratio of the second frame and a frame size of the second frame.

20. A non-transitory machine-readable storage medium having instructions which, when executed by one or more processors, cause the one or more processors to perform operations, comprising:
   providing an image in a first frame within a first layout in accordance with region data associated with the image and frame information associated with the first frame, wherein the region data indicates a portion of the image that is visible within at least the first frame based on a first adjustment, and wherein the frame information associated with the first frame indicates at least one of a frame aspect ratio of the first frame and a frame size of the first frame;
   receiving a request to display the image in a second frame of a second layout, the second frame being different than the first frame; and
   providing the image in the second frame using the region data and frame information associated with the second frame such that the portion of the image is visible within the second frame, wherein the frame information associated with the second frame indicates at least one of a frame aspect ratio of the second frame and a frame size of the second frame.

21. The non-transitory machine-readable storage medium of claim 20, wherein the instructions cause the one or more processors to perform further operations, comprising:
   receiving a user input indicating a second adjustment to the portion of the image visible within the second frame such than an adjusted portion of the image is visible within the second frame based on the second adjustment;
   generating adjusted region data corresponding to the second adjustment; and
   storing the adjusted region data.

22. The non-transitory machine-readable storage medium of claim 21, wherein the storing of the adjusted region data includes storing the adjusted region data with an identifier associated with the image and the frame information associated with the second frame.

23. The non-transitory machine-readable storage medium of claim 21, wherein the instructions cause the one or more processors to perform further operations, comprising:
   accessing a set of region data for at least one of varying frame aspect ratios of the image and varying frame sizes of the image, the set of region data including the region data indicating the portion of the image to be visible within the second frame; and
   extrapolating the adjusted region data based on the at least one of frame aspect ratios and frame sizes of the set of region data.

24. The non-transitory machine-readable storage medium of claim 20, wherein the instructions cause the one or more processors to perform further operations, comprising:
   accessing a set of region data for varying frame aspect ratios of the image, the set of region data including the region data indicating the portion of the image to be visible within the second frame; and
   determining that a particular frame aspect ratio associated with the region data is similar to a frame aspect ratio of the second frame.

25. The non-transitory machine-readable storage medium of claim 20, wherein
   the instructions cause the one or more processors to perform further operations, comprising:
   accessing a set of region data for varying frame sizes of the image, the set of region data including the region data indicating the portion of the image to be visible within the second frame; and
   determining that a particular frame size associated with the region data is similar to a frame size of the second frame.

* * * * *